T. J. McGEARY.
Cornices.
No. 5,884.
Reissued May 26, 1874.
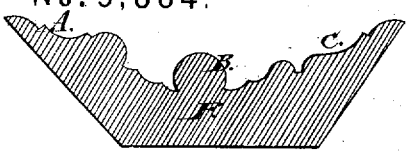
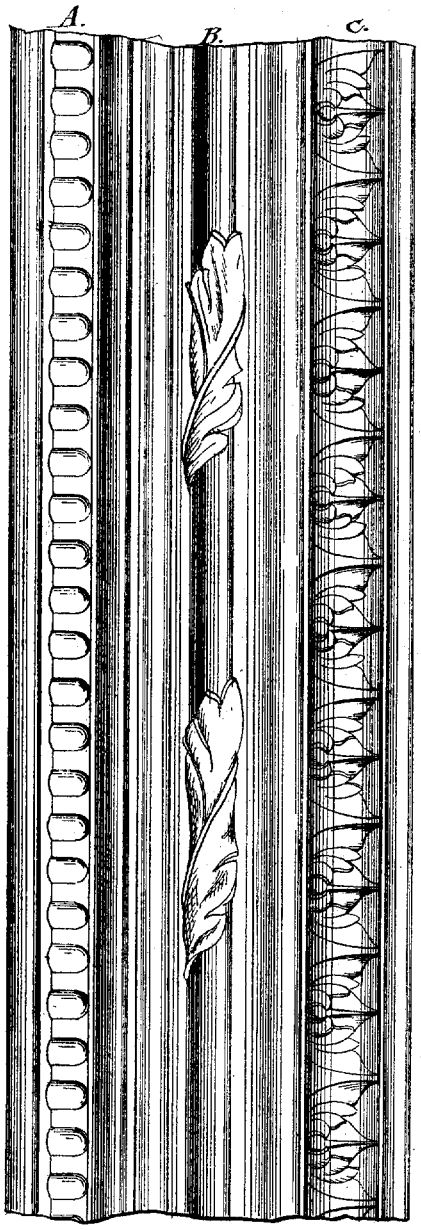
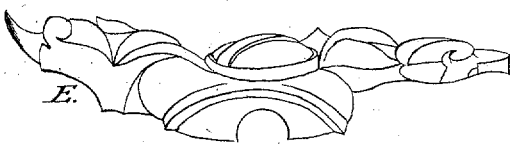
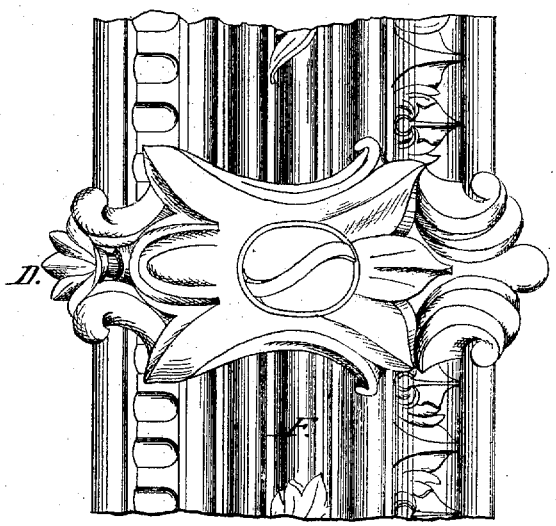
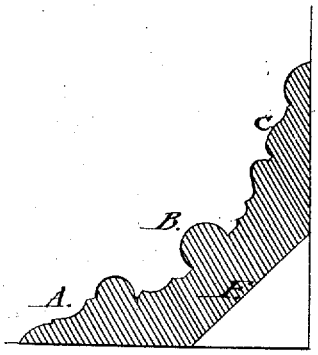
*Witnesses:*
S. S. Hughson
Jno. A. Collins
*Inventor:*
Thos Jno C. Geary
A.M. PHOTO-LITHOGRAPHIC Co. N.Y. (OSBORNE'S PROCESS.)

UNITED STATES PATENT OFFICE.

THOMAS J. McGEARY, OF BUFFALO, NEW YORK.

IMPROVEMENT IN CORNICES.

Specification forming part of Letters Patent No. 99,930, dated February 15, 1870; reissue No. 5,884, dated May 26, 1874; application filed March 2, 1874.

*To all whom it may concern:*

Be it known that I, THOMAS J. McGEARY, formerly of Newark, Essex county, State of New Jersey, and now of Buffalo, Erie county, State of New York, have invented a certain new and useful Mode of Casting and Putting up Ornamental Cornices in Plaster-of-Paris, (gypsum,) or other article of similar or like nature; and I do hereby declare that the following is a full, clear, and exact description thereof, reference being had to the accompanying drawings, and letters of reference marked thereon.

The nature of my invention consists in casting cornices to be used as a finish for the angles of rooms at the intersection of the wall and ceiling, such cornices to be cast in sections, either ornamental or otherwise, the joints or junctions to be covered with a leaf or other ornamental design, the object of my invention being to provide a cornice that may be made in a shop or factory, so that different patterns or designs can be kept on hand ready for use; the sections to be made in suitable lengths to be easily handled or transported from the place where they are molded to any distance, and cemented to their place on the walls and ceilings.

It will be readily seen that this plan of manufacturing cornice has very many advantages, namely: It may be made and kept as an article of merchandise, ready to be transported to any part of the world, where an ordinary workman can put it up; it is also much cheaper, as fully one-half of the labor of putting up cornice in the old manner is saved; it makes a more durable cornice, for, being cast in sections, it is not so liable to crack, and, in case it is broken, a new section can be inserted at one-fourth the former cost of repairing broken cornice.

F in the drawing represents the main member of the cornice. A B C are ornamental attachments, cast in the same piece with cornice F. D is the leaf or covering for the joints of the several sections, which, when attached, presents to the eye a cornice apparently solid. E is a sectional view of the leaf or covering.

Formerly the main member of the cornice F was run with a mold on the ceiling, and the ornamental attachments A B C were cast in wax molds and attached to cornice F, thus differing very essentially from my method.

Having thus described my invention, what I claim as new, and desire to secure by Letters Patent, is—

1. As a new article of manufacture, a portable cornice cast in sections, substantially as and for the purpose set forth.

2. An improved cornice cast in sections, with its ornamental parts, the sections being covered at their junctions by a leaf or other ornamental design, as and for the purpose set forth.

THOS. J. McGEARY.

Witnesses:

WM. C. FITCH,

G. W. MATTHIES.